DEFLECTION CIRCUIT ARRANGEMENT
Filed Dec. 31, 1949
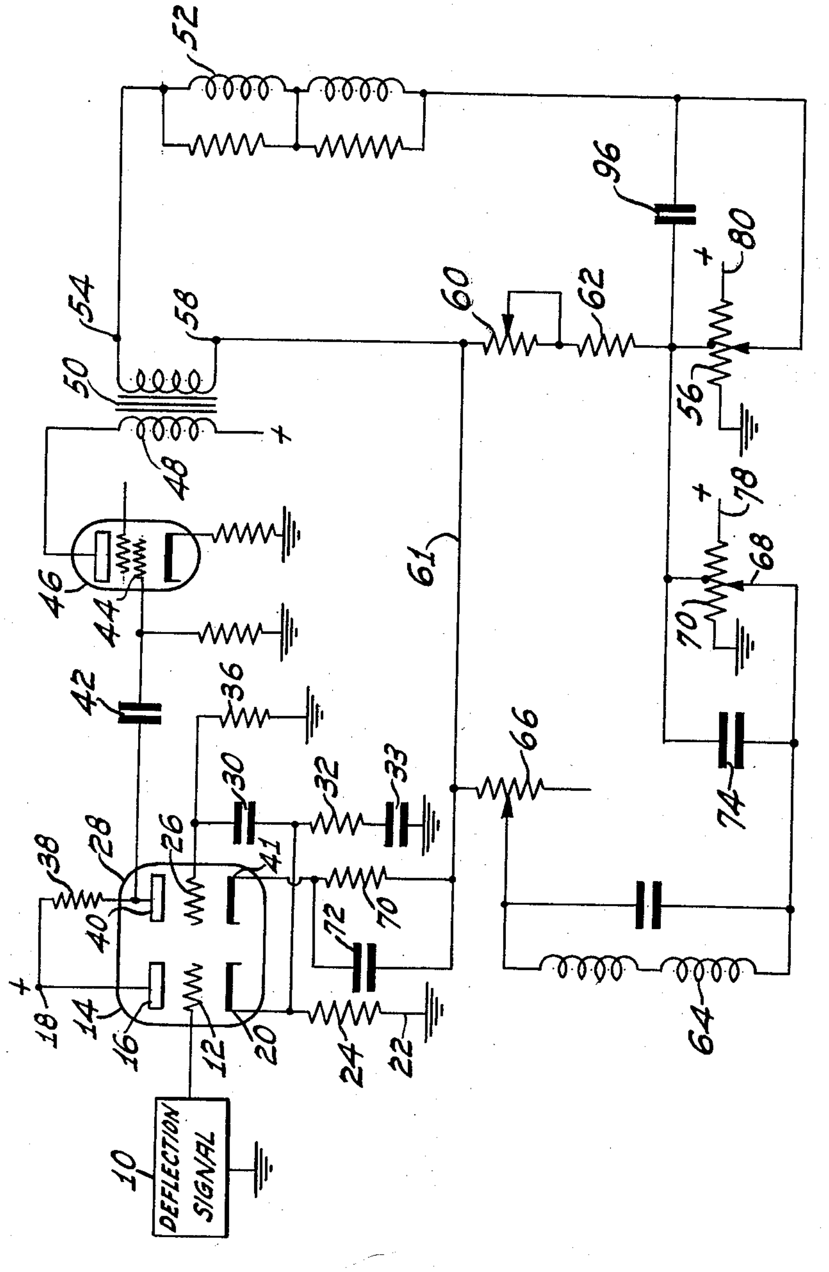
INVENTOR
Jeremiah M. Morgan
BY
[signature]
ATTORNEY Patented July 3, 1951

2,559,512

UNITED STATES PATENT OFFICE 2,559,512

DEFLECTION CIRCUIT ARRANGEMENT

Jeremiah M. Morgan, Cranbury, N. J., assignor to Radio Corporation of America, a corporation of Delaware Application December 31, 1949, Serial No. 136,347

7 Claims. (Cl. 315—27)

The present invention relates to deflection circuits and the like and deals more particularly although not necessarily exclusively, with a novel circuit arrangement for exciting a plurality of electromagnetic deflection yokes from a single source of deflection signal.

In even greater particularity, the present invention is involved in an improved deflection signal distribution system which permits a highly efficent distributon of deflecton signal energy to a plurality of electromagnetic deflection yokes in such a way as to permit independent adjustment of each of the deflection yoke circuits without greatly influencing the deflection current conditions obtained in other associated deflection yokes.

In the television art, there often arises the need for supplying a plurality of deflection yokes from a single source of deflection energy without creating too high a degree of interdependence between signal conditions in one yoke and signal conditions in another yoke. For instance, in television studio equipment, it is frequently desirable to directly associate with the television sync generator a monitoring kinescope for visually checking the quality of the television signal before transmission. In such arrangements, it is most economical to supply the signal deflection of the monitoring knescope from signal energy used also as sweep voltage for an adjacent television camera tube. However, care must be exercised to see that although separate width controls must be provided for each of the deflection yokes, variation of current amplitudes through one of the yokes will not seriously effect current waveform through the other deflection yoke. In order to provide such a compound deflection circuit arrangement with the needed versatility, it has generally been thought that considerable circuit cost and bulk would have to be tolerated.

It is therefore a purpose of the present invention to provide a new and improved signal circuit distribution system for use in a concomitant excitation of a plurality of electromagnetic deflection yokes.

It is another object of the present invention to provide an improved cathode ray beam deflection yoke driving arrangement wherein at least two deflection yokes may be operated from a single source of deflection signal with separate means being provided for independently varying the size and centering current through each of the deflection yokes without greatly influencing operation of the other deflection yoke.

In a realization of the above objects, the present invention contemplates the use of an electronic amplifier having input and output terminals, the input terminals being connected with a source of deflection signal. The amplifier is provided with an inverse feedback input terminal for conventional stabilization and distortion correction. In the case of a two deflection yoke system, one deflection yoke is placed in series with a resistance across the output of the electronic amplifier while the other deflection yoke is placed in shunt with at least a portion of said resistance. Feedback voltage for the inverse feedback input terminal is then obtained from a point along said resistance source to correct any waveform distortion appearing thereacross. Separate centering and size controls may then be inserted in series with each of the deflection yokes without causing any appreciable degree of interaction between the deflection yokes.

Other objects and features of advantage in addition to those set forth hereinabove as well as a complete understanding of the character and operational mode of the present invention may be obtained through reference to the following description taken in connection with the single drawing representing in block and schematic form one embodiment of the present invention.

Referring to the drawing, there is indicated by the block 10 a source of deflection signal which may be sawtooth in form. The deflection signal is applied to the control electrode 12 of the first discharge tube section 14. Discharge tube section 14 has its anode 16 connected directly with the source of positive potential 18 while its cathode 20 is connected to a datum or ground potential 22 through a cathode resistance 24. The output of the first discharge tube section 14 is taken across the cathode resistance 24 and coupled to the control electrode 26 of the second discharge tube section 28 through coupling capacitor 30. A time constant circuit comprising resistor 32 and capacitor 33 may be connected in shunt with the cathode resistance 24 if desired. Grid return resistance 36 is of course connected from the control electrode 26 to ground.

The output of discharge tube section 28 is then taken across load resistance 38 connected between the anode 40 of the second discharge tube section and some source of positive potential. Deflection signal variations in the anode 40 are coupled via capacitor 42 to the control electrode 44 of the output discharge tube 46 in a conventional manner. The output of the amplifier 46 may be transformer terminated by including the primary 48 of transformer 50 in series with the anode cathode circuit of the discharge tube 46.

In accordance with the present invention, the first deflection yoke 52 is connected from the amplifier output terminal 54 to ground potential, through a portion of the centering control 56. The other amplifier output terminal 58 is then connected to a variable resistance 60 and a fixed resistance 62 to another point on the centering control 56. A second deflection yoke 64 is then connected in series with a variable resistance 66 to form a combination, the upper extremity of which is connected to the upper terminal of resistor 60 and the bottom extremity of which is connected to the variable tap 68 on the second yoke centering control 70. The cathode 41 of the discharge tube section 28 is then connected through cathode resistance 70 to the upper extremity of resistor 60. It is to be noticed that in such an arrangement capacitors 72, 74 and 96 are sometimes desirable for by-passing their associated resistors for signal frequencies of a higher order.

As can be seen from the drawing, in operation the variable resistor 60 connected with the amplifier output terminal 58 may be considered as a size control for the first yoke 52 while the variable resistance 66 connected with the second deflection yoke 64 may be thought of as a size control for this latter deflection yoke. By connecting the free terminals 78 and 80 of centering control potentiometers 70 and 56 respectively to sources of unidirectional potential means are thereby provided for shifting the electron beam in the respective kinescopes according to well known beam centering practice. The feedback of voltage from across the resistor 60 via circuit path 61 establishes a form of current feedback which ensures that the current wave form through the yoke 52 as well as the voltage waveform across the resistors 60 and 62 maintain themselves quite linear.

A study of the arrangement shown in the drawing will reveal that the present invention has provided an extremely simple and economical arrangement for the compound excitation of two such deflection yokes. If current feedback is to be used in a deflection circuit, and such use is generally highly advisable, there must be inserted in the output circuit of the amplifier some resistance element to determine just what the current waveform through the first deflection yoke actually is. Thus by placing the second reflection yoke in shunt with this feedback resistance comprising resistors 60 and 62, very little or no unnecessary circuit loss is tolerated, whereas otherwise the second deflection yoke 64 would have been normally connected in series or shunt with the deflection yoke 52. By placing the yoke 64 in shunt with the feedback resistors 60 and 62 not only is circuit power economy improved, but the yoke 64 provides an additional path for cathode current flow in the second discharge tube section 28. Therefore, the signal on the cathode 41 will not only vary in accordance with sawtooth generator signal applied to the control electrode 26 but also in accordance with the inverse feedback voltage across resistors 60 and 62 and to some extent in accordance with the voltage variations across the second deflection yoke 64. Thus the waveform delivered to the output transformer 50 will be in effect correctively influenced by the waveform through each of the deflection yokes and variation of the amplitude of deflection currents through either of the yokes will not greatly affect current conditions through the other.

It is clear that although the present invention has been shown in connection with an electronic amplifier having three separate discharge tube sections 14, 28 and 46, its utility is in no way limited thereto. Obviously, any electronic amplifier having input and output terminals with means for feeding back an inverse feedback voltage could be employed. Moreover, it is evident that the output transformer 50 is not required for the successful practice of the present invention inasmuch as other output arrangements for the final electronic amplifier will serve equally well.

Having thus described my invention, what I claim is:

1. In a deflection circuit including a source of sawtooth type deflection voltage, a voltage datum terminal, a first and second electromagnetic deflection yoke, an electronic amplifier having sets of input and output terminals and also an inverse feedback input terminal said latter terminal being referenced to said datum terminal, a resistance element connected in series with said first deflection yoke across said amplifier output terminals, a circuit path from said resistance to said datum terminal, connections for placing said second deflection yoke in shunt with said resistance, and a coupling from said resistance to said feedback input terminal.

2. In a deflection circuit including a source of sawtooth type deflection voltage, a voltage datum terminal, a first and second electromagnetic deflection yoke, an electronic amplifier having sets of input and output terminals and also an inverse feedback input terminal said latter terminal being referenced to said datum terminal, a first and second yoke centring current source, a resistance element, connections placing said first yoke in series with said amplifier output terminals, said resistance and said first centering current source to form a closed loop, a circuit path from said resistance element to said datum terminal, connections placing said second yoke in series with said second yoke centering current source in shunt across at least a portion of said resistance, and a coupling path from said resistance to said inverse feedback input terminal.

3. In a combination television deflection circuit including a source of sawtooth voltage and a first and second electromagnetic deflection yoke, a voltage datum terminal, an electronic amplifier having separate sets of input and output terminals and also an inverse feedback input terminal, said latter terminal being referenced to said datum terminal, a first variable resistance, a first and second beam centering potentiometer respectively corresponding to said first and second deflection yokes, a variable resistance connected from one of asid output terminals to a point on said first potentiometer, connections placing said first deflection yoke between said other amplifier output terminal and another point on said first potentiometer, a second variable resistance connected from the output terminal extremity of said first variable resistance and one terminal of said second deflection yoke, a connection from the other terminal of said second deflection yoke and a point on said second potentiometer and a connection from another point on said second potentiometer to the other side of said first variable resistance and a connection from the inverse feedback input terminal of said amplifier to a point on said first variable resistance.

4. In a compound deflection circuit adapted to excite a first and section electromagnetic deflection yoke in accordance with a source of deflection signal, in combination, an electronic amplifier having output terminals and including an electron discharge tube having at least an anode, cathode and control electrode, means for applying sawtooth deflection signal from said source to the control electrode of said discharge tube, a signal channel from the anode of said discharge tube to the output terminals of said electronic amplifier, connections placing said first deflection yoke in series with a first resistance across the output terminals of said amplifier, connections placing said second deflection yoke in series with a second resistance in shunt with said first resistance and a connection from said first resistance to the cathode of said electron discharge tube.

5. Apparatus according to claim 4 wherein there is additionally placed in series with each deflection yoke a separate control source of beam centering potential.

6. A compound stabilized deflection circuit for separately exciting a first and second electromagnetic beam deflection yoke by waves derived from a source of deflection signal comprising in combination, an electronic amplifier having input and output terminals, said input terminals being associated with a first electron discharge tube having at least an anode, cathode and control electrode, a coupling between said source of deflection signal and said electron discharge tube control electrode, a signal channel connected from the anode cathode circuit of said discharge tube to the output terminals of said amplifier, a potential reference datum connection for placing said first deflection yoke from one amplifier output terminal through a first resistance element to said reference datum, a second resistance element connected from said other output terminal to a point on said first resistance element, a third resistance element connected in series with said second deflection yoke to form a combination from one terminal of said combination to the output terminal extremity of said second resistance element and a connection from the other terminal of said combination to said reference datum through a fourth resistance element, a connection from the first resistance element extremity of said second resistance to a point on said fourth resistance element and a connection from said electron discharge tube cathode to a point on said second resistance.

7. Apparatus according to claim 6 wherein the extremities of said first and fourth resistance elements away from said reference datum are connected to a source of unidirectional potential to establish a current flow therethrough and wherein at least one connection to said first and fourth resistance elements are of the variable variety adapting said resistance elements for use as yoke beam centering controls.

JEREMIAH M. MORGAN.

REFERENCES CITED

The following references are of record in the file of this patent:

UNITED STATES PATENTS

| Number | Name | Date |
|---|---|---|
| 2,214,729 | Hickok | Sept. 17, 1940 |
| 2,260,546 | Tingley | Oct. 28, 1941 |
| 2,369,631 | Zanarini | Feb. 13, 1945 |
| 2,414,939 | Fitch | Jan. 28, 1947 |